Nov. 30, 1943.   F. A. PARSONS   2,335,305
MACHINE TOOL TRANSMISSION AND CONTROL MECHANISM
Filed Oct. 20, 1942   5 Sheets-Sheet 1

INVENTOR
Fred G Parsons

Nov. 30, 1943.  F. A. PARSONS  2,335,305
MACHINE TOOL TRANSMISSION AND CONTROL MECHANISM
Filed Oct. 20, 1942  5 Sheets-Sheet 4

INVENTOR
Fred G Parsons

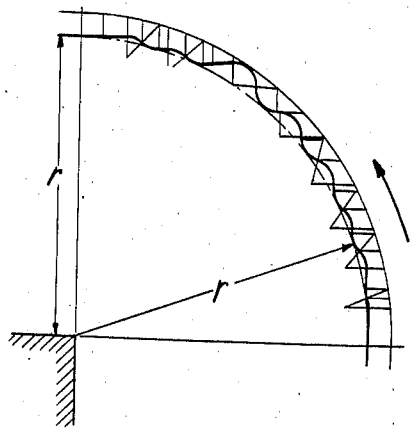
Fig. 9.
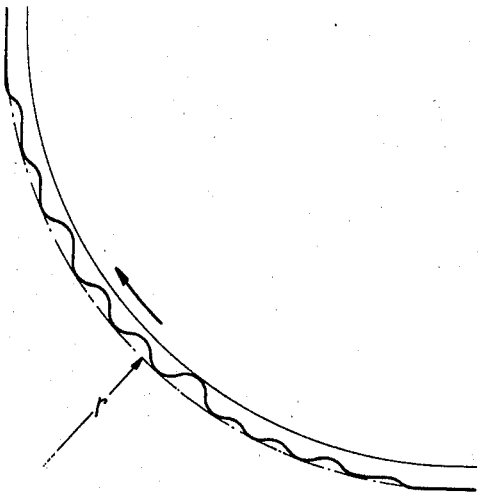
Fig. 10.
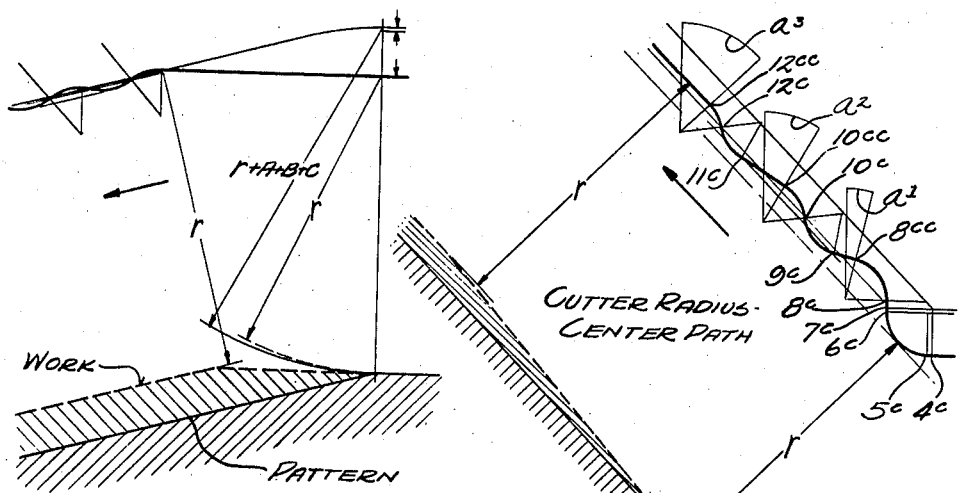
Fig. 11.
Fig. 12.

Patented Nov. 30, 1943

2,335,305

UNITED STATES PATENT OFFICE 2,335,305

MACHINE TOOL TRANSMISSION AND CONTROL MECHANISM

Fred A. Parsons, Milwaukee, Wis., assignor to Kearney & Trecker Corporation, West Allis, Wis., a corporation of Wisconsin Application October 20, 1942, Serial No. 462,714

39 Claims. (Cl. 90—13.5)

This invention relates to machine tools and particularly, but not exclusively, to automatic copying machines where the form of a pattern or master is copied through tracer means which controls the relative movements of the work and tool.

Automatic copying utilizes tracer means which responds to changes in the pattern form to effect correction operations in the relative rate of tool and work movements in at least two mutually transverse paths, whereby to cause the tool to copy the pattern form on the work piece. There is a time interval or lag involved in initiating and completing any such rate correction operation which, unless compensated, operates to limit the copying accuracy and speed for any given machine. In a co-pending application Serial No. 443,488, filed May 18, 1942, there is explained a copying method and machine in which the lag is compensated for effecting inherently accurate copying at any speed. The present invention utilizes some of the lag compensating methods of said co-pending application in an improved and simplified manner and provision is made for restricting or eliminating the effect of other sources of possible inaccuracy, such as lost motion, variations in working load, etc.

A purpose of the invention is to provide a copying machine which is substantially accurate in spite of various factors such as lag, lost motion, variations in working load, etc., which normally operate to limit the accuracy of the machine, or the rate of production, or both.

A further purpose is to provide a copying machine in which accurate copying may be effected at any speed which the machine, the tools, and the required surface finish of the work piece will stand.

A further purpose is to provide a copying machine in which support movement in two paths is pattern controlled to effect substantially straight-path movement in other paths angularly disposed relative to both of the two support paths.

A further purpose is to provide a transmission and control mechanism for machine tools in which transmission lost motion effects are automatically eliminated, and particularly for copying machines.

A further purpose is to provide transmission and control mechanism for machine tools, in which the lag effects of inertia, etc., normally operating to resist and delay a rate change of the moving parts are controlled in such manner as to minimize the power, or the time interval, or both, required for rate change operations, and particularly for copying machines.

A further purpose is to provide a transmission and control mechanism for the relative movement of machine tool supports, in which brake devices operate in an improved transmission and control relationship for various purposes including a change of the relative rates of the supports and the elimination of lost motion, particularly for copying machines.

A further purpose is to provide improved hydraulically operated mechanism in a form and organization particularly adapted for effecting some or all of the purposes previously mentioned.

A further purpose is generally to simplify and improve the construction, organization, and operation of machine tools, and particularly for copying machines, and still other purposes will be apparent from this specification.

Various modifications of the invention herein illustrated and described are contemplated, and it is to be understood that the invention includes all modifications within the spirit and scope thereof, and of the claims.

Throughout the specification the same reference characters have been used to identify the same parts, and in the drawings:

Figure 3A is a sectional view through a modified form of the throttle valve mechanism shown in Figs. 3, 4.

Figures 4A, 4B are respectively enlarged longitudinal and transverse sectional views of a control drive used in the transmission of Fig. 4, the section Fig. 4B being taken at line 4B, 4B of Fig. 4A.

Figures 5, 6, 7, 8, 9, 10, 11 are diagrams, greatly enlarged, showing the path followed by the cutter during the copying of various pattern surfaces by the machine of Fig. 1.

Figure 12 is a diagram of a modified cutter path, also greatly enlarged, which results when copying a 45° outward angle while using a certain selectively usable modified control mechanism for the machine of Fig. 1.

Figure 1:
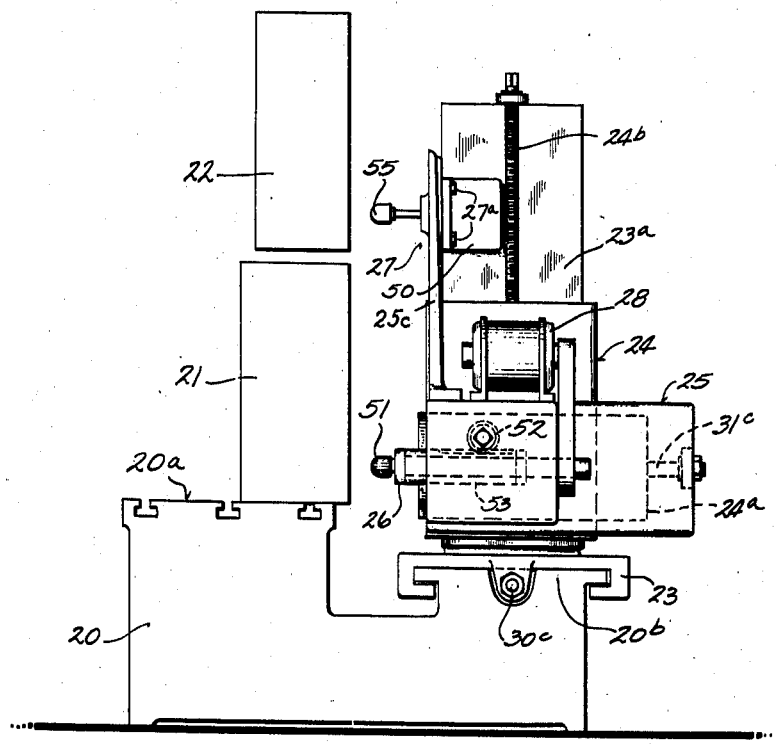
Figure 1 is an elevation of a copying machine which incorporates the invention.

In the copying machine of Fig. 1 a base 20 provides a stationary work support or table portion 20a for carrying a work piece such as 21 and a pattern such as 22, each rigidly fixed with the support by the means of suitable fixtures and clamps, not shown. A longitudinally movable support 23 is carried by a slide portion 20b of the bed and carries a support 24 vertically movable on a slide portion 23a, the support 24 carrying a support 25 movable toward and from the pattern and work piece on a slide portion 24a.

The support 25 carries a rotatable tool spindle 26 and a tracer unit 27, the tracer unit being carried on an upwardly extending arm or bracket 25c fixed on the support, the unit being guided on the bracket for vertical adjustment, to be fixed by the means of bolts, such as 27a, in a predetermined spacing relative to spindle 26, corresponding to the desired spacing of the configuration of pattern 22 relative to a similar configuration to be copied on the work piece.

Tool spindle 26 is driven selectively at various speeds by a motor 28 carried on support 25, there being suitable means, not shown, provided for effecting the various spindle speeds, as by any conventional control of the motor speed or by any suitable rate changer in the train connecting the motor and spindle.

Figure 2:
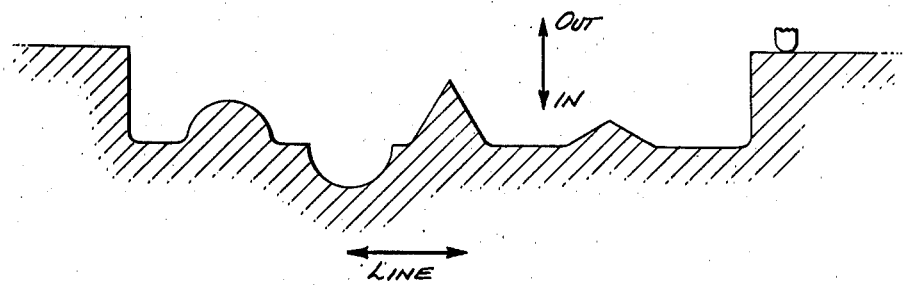
Figure 2 is a sectional view of a pattern contour such as might be copied in the machine of Fig. 1.

In a machine such as shown in Fig. 1 a pattern contour such, for example, as is shown in cross section in Fig. 2, may be copied on the work piece by utilizing the movements of support 25 toward and from the pattern respectively to effect "in" and "out" directions of movement as indicated by the arrows in Fig. 2. In such case the "line" path of movement, indicated in Fig. 2 as transverse to the "in-out" path might be effected either by the vertical movement of support 24 or by the longitudinal movement of support 23 of the machine of Fig. 1. Whichever of these supports 23 or 24 is selected for the "line" movement the other might be provided with means for effecting a "cross" movement transverse to both the "in-out" and "line" paths, the cross movement preferably being by the means of a step-by-step action limited to take place at one or both ends of the reciprocatory "line" movement.

It is apparent that the "line," "in-out," and cross copying movements mentioned may be effected by any suitable arrangement of supports which will effect relative work and tool movement in each of three mutually transverse paths. Thus, for example, the pattern 22 and work 21 might be bodily movable, instead of the tracer and tool, or the tracer and spindle might be arranged for the spindle axis to be vertical, etc. It will therefore be understood that the copying transmission and control mechanism described herein may be used for any suitable arrangement and use of three supports relatively movable in mutually transverse paths and, to avoid confusion, the relative support movements will be referred to herein as "line" and "in-out" movements relative to the pattern contour as identified in Fig. 2, and the "cross" movements will be understood to be transverse to each of the other paths, irrespective of direction of the movements relative to the horizontal or vertical.

Figure 3:
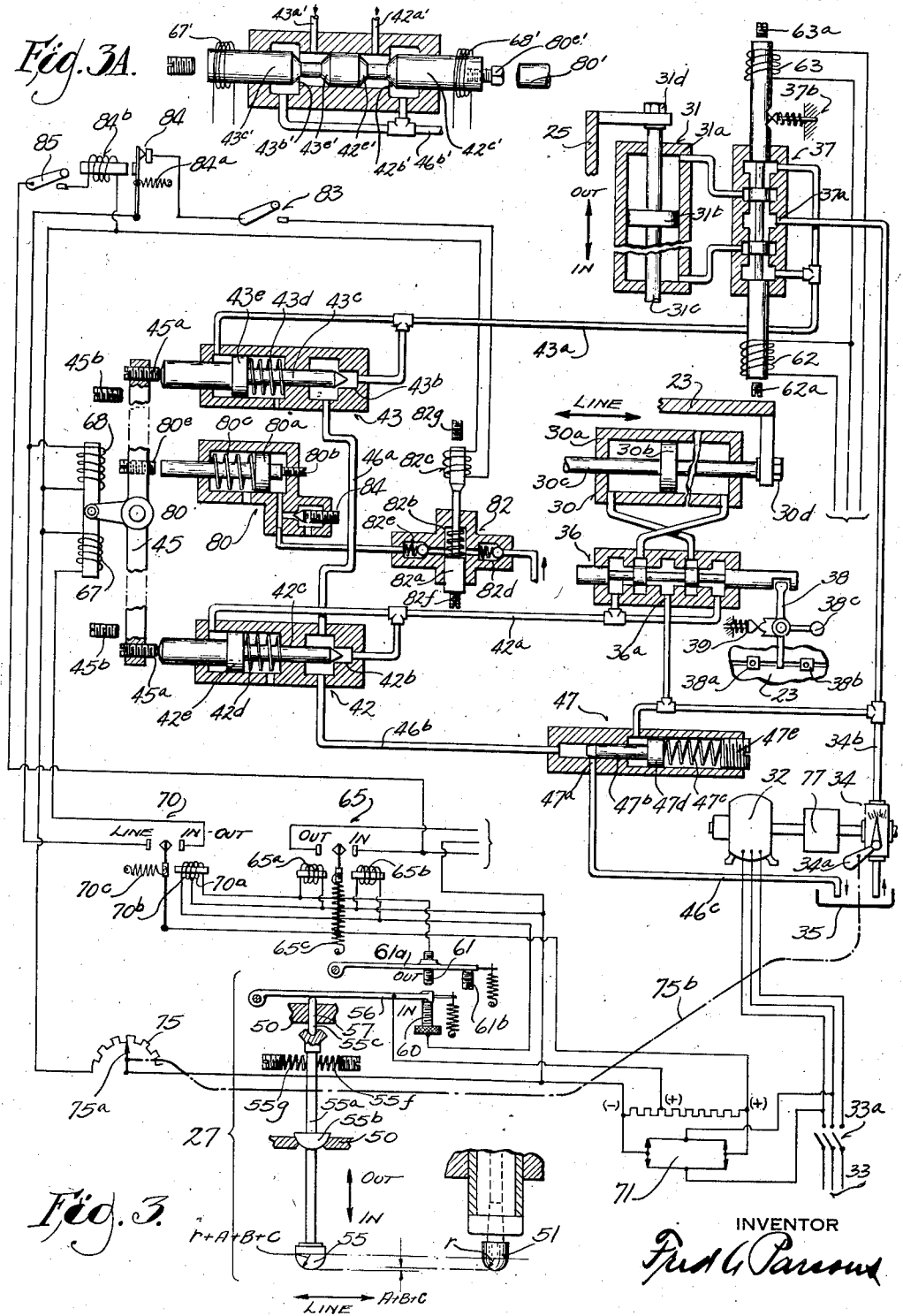
Figure 3 is a diagrammatic view of the transmission and control mechanism used in the machine of Fig. 1 when the transmission mechanism is hydraulic.

The copying transmission and control mechanism diagrammatically shown, in Fig. 3 may be used for any suitable support arrangement, as stated, but as applied herein to the machine of Fig. 1, the line movement is effected by the support 23, by the means of a hydraulic motor 30, there being a cylinder 30a fixed with the bed 20 and a piston 30b fixed for movement with support 23 by the means of a piston rod 30c and nut 30d. The "in-out" movement is effected by the support 25, by the means of a hydraulic motor 31 having a cylinder 31a fixed with support 24 and a piston 31b fixed for movement with support 25 by the means of a piston rod 31c and a nut 31d. For various reasons it is preferable that the piston displacement shall be the same in either direction of movement for each of the motors 30, 31, and also the same for both motors and the pistons are, therefore, shown of the same diameter and with the rods extended in both directions. The cross movement of the machine is effected by the support 24, by the means of a screw 24b, Fig. 1, which is fixed against axial movement relative to the slide 23a, there being suitable nut means, not shown, engaging the screw and fixed with support 24. Screw 24b is preferably given a step-by-step rotation for effecting an increment of cross feed at either or both ends of the "line" movement of support 23 by any suitable means, not shown, there being a variety of well-known devices which may be used for such purpose as, for example, the means illustrated and described in said co-pending application, where the cross feed screw is actuated from the "line" support transmission by dog operated ratchet means.

Each of the movable supports, Fig. 3, is primarily actuated from a constant speed source, here shown as an electric motor 32, driven from an A. C. line 33 through a main switch 33a, the power source driving a pump 34 which is adjustable for variable volume delivery for rate change purposes by the means of a hand lever 34a. The pump may be of any suitable well known type and draws liquid, such as oil, from a reservoir 35 and delivers the liquid through a channel 34b indifferently to the inlet port 36a of a reverser valve 36, which selects the direction of "line" movement of motor 30, or to the inlet port 37a of a reverser valve 37 which selects "in" or "out" direction of movement of the motor 31 and has a conventional detent 37b for yieldably retaining the valve in shifted position. The pump 34 operates for positive delivery of the pumped liquid to the two reverser valves, as will be explained, but suitable safety relief valve means, not shown, may be used in the usual manner to prevent overload. With the arrangement shown the pump is indifferent to which of the motors 30, 31 is driven, and will drive either motor at maximum or at any intermediate speeds, but the sum of the support speeds is constant as determined by the pump adjustment.

The reverser valves 36, 37 are of a conventional plunger type and need not here be described in detail. In Fig. 3 both the reverser valve plungers are, for convenience, shown in their central position blocking delivery of pump liquid, but it will be understood that the valve control means, later described, is such that during operation of the machine the valves each occupy the one or the other of their direction positions and are in central position only during movement from the one to the other operating position.

The "line" reverser valve 36, Fig. 3, is dog operated by a pivoted lever 38 having its one end projecting into the path of dogs such as 38a, 38b each adjustably fixed on the support 23, as by suitable T slot and bolt means. The other end of the lever 38 engages a suitable slot in the reverser plunger, as shown. Associated with the lever 38 there is a detent means 39 of conventional cam and plunger type, operating to yieldably retain the valve in either direction position, there being lost motion in the engagement of the lever end of the valve plunger whereby, in either direction of valve plunger movement, the cam point will pass the point of the detent plunger before the valve leaves its previous direction position, to effect automatic reversal of the direction of movement of support 23. The spaced dogs 38a, 38b, therefore, operate for continuous reciprocatory "line" movement of support 23, as controlled by the position and spacing of the dogs. The "line" reverser 36 may also be manually controlled by the means of a hand lever 38c fixed with the lever 38.

The simultaneous connection of the pump 34 to supply both the reverser valves is such that the pump is indifferent to the relative rates of movement of the "line" and "in-out" supports 23, 25, as stated, the relative rates being controlled by two outlet throttle valve devices generally denoted as 42, 43, Fig. 3, respectively controlling the outflow of liquid from the outlet ends of the cylinders 30a, 31a in any position of the reverser valves. Thus, the reverser valves 36, 37 are constructed for the liquid outflow from the motors 30, 31, in either direction position of the reverser valves, to pass through the respective channels 42a, 43a, which connect with ports 42b, 43b of the respective throttle devices. The throttle devices respectively include the similar plungers 42c, 43c, each plunger being movable axially to the right in Fig. 3 to a position where the end portion of the plunger closes the associated port to prevent outflow of liquid therethrough, and movable in the other direction to a position where the throttle is open, and presents little or no resistance to the outflow of liquid therethrough. The plungers 42c, 43c are interconnected for movement by the opposite arms of a pivoted lever 45, each plunger being continuously urged in the direction of the lever arm by springs such as 42d, 43d. When the lever 45 effects the closing of the one outlet port 42b, 43b, the other outlet port will be open, and vice versa, there being abutment screws 45b, 45b adjustably limiting the angular movement of the lever. The throttles may also occupy partially closed positions, as will later appear.

The throttles and associated parts constitute brakes simultaneously adjustable to slow down the one support and increase the speed of the other support whenever the relative area of the throttle port openings is changed, each brake device comprising the piston cylinder and piston portions at the outlet side of the motor together with the outlet passageway connecting the motor with the throttle valve port, and the throttle plunger which operates to variably throttle the port opening whereby to increase or decrease the force opposing the support movement.

The throttle plungers 42c, 43c are each provided with means automatically balancing the axial pressure of the liquid against the throttle end of the plunger, such balancing means including the pistons 42e, 43e respectively fixed with the different plungers and each continuously acted upon by the liquid pressure of the corresponding motor outlet channel 42a or 43a, the effective area of the pistons being equal to the effective area of the plunger end exposed to the corresponding outlet. Whatever may be the instant pressure of the liquid tending to oppose the closing of the throttle, such pressure is balanced by the piston area exposed to the same pressure whereby the force required for movement of the throttle plungers in either direction is substantially constant and relatively small, since it operates only against the inertia and friction of the plungers and their actuating parts. The balancing action is later explained in detail.

In the operation of the machine the outlet throttle valve devices constitute brake devices operating to regeneratively utilize the energy of the moving parts for decelerating the rate of movement of supports 23, 25, as is later explained.

After passing through the outlet ports 42b or 43b under the control of the valves 42, 43, the outlet liquid from the motors 30, 31 is returned to the reservoir 35 through channels such as 46a, 46b, 46c, the passageway including the outlet port 47a of a back pressure control valve 47. This valve has a plunger 47b which is continuously urged by a spring 47c, having an adjustable abutment screw 47e, in a direction to close the outlet port 47a, but is continuously urged in the other direction by the instant pressure of the liquid in the supply channel 34b, acting on a piston 47d which is fixed with the plunger.

The pressure of spring 47c of valve 47 may be adjusted for effecting a relatively high liquid pressure in the motor outlet channels 42a, 43a when no material working load opposes the movement of the supports, in which case there will be substantially equal relatively high instant pressure in the supply channel 34b. Any instant working load which opposes support movement then operates to increase the pressure in the supply channel 34b whereby the piston 47d acts to decrease the back pressure in channels 42a, 43a. By the selection of suitable characteristics for the spring 47c and for the throttle plunger operating on outlet port 47a, it will result that, throughout the normal range of working loads the total opposition to support movement set up by the combined instant hydraulic and working load resistance is of sufficient value to eliminate lost motion and the combined forward pressure and back pressure then operates to maintain the supports in their tracer controlled and pattern determined positions at all times, as is later more fully described.

The working loads just referred to are such as to oppose the movement of the supports 23, 25. In some operations, particularly where the copying operation is effected by rotary milling cutters, the working loads may be in the opposite direction, tending to urge the supports ahead of their normal drive means. In such case the pressure from channel 34b on the valve piston 47d is decreased and the spring 47c operates to increase the back pressure in the outlet channels 42a, 43a to prevent overrun of the support and at the same time maintaining sufficiently high forward pressure to maintain the supports in accurately pattern controlled relative positions, the same as for working loads which oppose the driving train.

The tracer unit 27, Figs. 1, 3, includes a hollow frame or housing 50 in adjustably fixed relation to a cutter 51 carried by the tool spindle 26. The tracer unit is adjustable vertically Fig. 1 and secured by the T bolts 27a, as has been stated, and the spindle and tool are adjustable relative to the tracer by the means of a gear 52 engaging suitable rack teeth on a spindle sleeve 53, the gear shaft having a squared end, as shown, exposed for a crank or wrench. Suitable means, not shown, is provided for clamping the spindle sleeve in adjusted position.

The tracer includes a pattern feeler or stylus portion 55, Figs. 1, 3, removably fixed on the outer end of a rod or shank 55a, the rod being mounted in the housing 50 for movement of the stylus 55 outwardly relative to the pattern, that is to say upwardly in Fig. 3, or laterally in any direction, as for example by a ball pivot portion 55b. Either the outward or lateral stylus movement shifts a contact bar or arm 56, which is pivoted on the housing 50, there being a slidable connector rod member 57 aligned with rod 55a and with its lower end, Fig. 3, engaging a conical seat in a member 55c removably fixed with the upper end of the rod. Various stylus members having an axial length to suit different patterns may be used, along with various members 55c having different cone angles such that the pivotal movement of the contact bar 56 is substantially equal for equal increments of either lateral or vertical movement of the stylus which is in use at the time, this being desirable for reasons which will appear.

The pivoted contact bar 56 is continuously yieldably urged inwardly, that is to say downwardly in Fig. 3, as for example by the spring means shown, to a position effecting a closed circuit through an adjustable "in" contact screw 60, which is the normal position of the contact bar when the tracer stylus is free of the pattern, the spring means simultaneously urging the stylus to fartherest down and laterally centered positions, Fig. 3. Sufficient displacement of the stylus 55 either laterally or outwardly from the "in" position will move the contact bar 56 to open the "in" contact 60 and close a circuit through an adjustable "out" contact screw 61 carried on a contact bar 61a, pivoted on the frame 50, which is continuously yieldably urged, as by the spring means shown, against an adjustable positioning screw 61b. In the method of control later described it is preferable that the tracer stylus should move more readily upwardly, Fig. 3, than laterally, and for this result there are provided suitable springs such as 55f and abutment screws such as 55g, the springs operating to center the stylus laterally and to cause the stylus to prefer outward, rather than lateral movement.

The pattern controlled movements of the tracer contact bar 56 control the operation of the reverser valve 37 for determining the "in" or "out" direction of movement of support 25 and also control the valve devices 42, 43 whereby to determine the relative rates of movement of the supports 23, 25.

Thus, the reverser valve 37 which determines "in" or "out" direction of movement may be shifted to an "in" position, determined by an adjustable abutment screw 63a, by the means of a solenoid 63, and the valve may be similarly shifted by a solenoid 62 to an "out" position determined by an adjustable abutment screw 62a, the "in" and "out" solenoids 62, 63 being selectively energized through a switch 65, controlled by relay coils 65a, 65b. This switch is provided with a biasing spring means 65c of conventional construction adapted to yieldably retain the switch in either closed position. Having been shifted to "out" position, for example, by the energizing of coil 65a the switch will remain in "out" position until the coil 65b is energized, and vice versa.

Also, pivoted lever 45, which controls the position of the throttle valve plungers 42c, 43c may be shifted to open the outlet port 43b, and simultaneously close the outlet port 42b, whereby to effect maximum rate of movement of support 25 in the "in" or "out" direction determined by the position reverser valve 37, by the means of a solenoid 67; and the lever may be oppositely shifted, whereby to effect maximum rate of "line" movement of support 23, in the forward or reverse direction determined by the reverser valve 36, by the means of a solenoid 68, the solenoids 67, 68 being alternatively energized through a switch 70. Switch 70 is continuously urged toward the "line" movement position by a spring 70c, but may be shifted to the "in-out" position when the energizing of either of relay coils, 70a, 70b, which are respectively in parallel with the coils 65a, 65b. Supplemental control means, later described, is selectively operable for control of valves 42, 43 to effect intermediate rates of "in-out" and "line" movement, but for the immediately following description it will be assumed that the controls operate to effect maximum "line" or "in-out" rates, as just mentioned.

As will be seen in the diagram, Fig. 3, the arrangement is such that when the tracer "in" contact 60 is closed the relay coils 65b and 70b are each energized from a relatively low voltage tap of a suitable D. C. supply source as, for example, a rectifier device 71, which then supplies full voltage current through the switches 65 and 70 to energize the solenoids 67 and 63, thereby to position the controls for stopping the "line" movement and effecting maximum rate of "in" movement. When the tracer "out" contact 61 is closed the relay coils 70a and 65a are each energized from the low voltage supply whereby the switches 65 and 70 supply full voltage current to the solenoids 67 and 62, thereby to position the controls for stopping the line movement and effecting maximum rate of "out" movement. In any intermediate position of tracer contact bar 56 both the "in" and "out" contacts are open, whereby none of the relay coils 65a, 65b or 70a, 70b are energized, and in such case the switch 70 is shifted by spring 70c to a position energizing the solenoid 68 to effect maximum rate of "line" movement of support 23 and stop the movement of the "in-out" support 25. The switch 65 and reverser valve 37, by reason of the described action of the spring means 65c, remain in whichever "in" or "out" position they previously occupied, until their subsequent position is determined by a closing of the "in" contact 60 or "out" contact 61. It results that the reverser valve 37 for the "in-out" support is shifted only when the pattern surface changes from a previously inward angle or curve to outward, or vice versa, which in the present method of control occurs relatively seldom for the usual copying operations, as will appear.

In said co-pending application, as has been stated, there is explained a method of copying which compensates for the lag involved in any direction correction or speed correction operation, whereby to effect accurate copying in spite of the lag. As an item of the means effecting such compensation the corner radius of the stylus is made larger than the corresponding corner radius of the cutter by an amount equal to the sum of the various lag distances involved during the specific operations of changing from maximum to zero "in" speed or from maximum to zero "line" speed, or vice versa. The incremental lag distances involved are, firstly the tracer lag distance A, which is the distance travelled by the support while a stylus such as 55, Fig. 3, is moved sufficiently to make or break one of the contacts 60, 61, Fig. 3. Also a control lag distance B, which is the distance travelled while the control devices, such as the relay operated switches 65, 70, are operated in accordance with the initial stylus movement. Also a machine lag distance C, which is the distance traversed from the time the control devices are energized until the controlled support is brought to a stop. In carrying out the lag compensating method the tracer and stylus radius centers are positioned at the same "in-out" level, but it is further necessary that the total lag distance $A+B+C$ be equal for the specific operations referred to, and of constant predetermined value irrespective of changes in working load or other working conditions The present machine follows substantially the method of lag compensation explained in said co-pending application, as will appear, and accordingly the tracer corner radius is made larger than the corresponding corner radius $r$ of the cutter by an amount equal to the total lag distances $A+B+C$, and the radius centers of the stylus and cutter are positioned at the same "in-out" level, as is shown in Fig. 3.

Th machine lag increment C is of predetermined constant value in the present machine. The axial balancing of the outlet control valves 42, 43 is such that, as previously pointed out, the resistance to the control movements effected by solenoids 67, 68 is constant whereby the time interval may obviously be made the same for the closing of either valve port 42b, 43b for the specific speed change operations mentioned. This would be sufficient for effecting a constant lag distance C if the rate adjustment of pump 34 remained in the same speed position for all copying operations, but in order to maintain lag distance C constant for various speeds it is necessary to vary the lag time value in accordance with the speed, and in the transmission of Fig. 3 this is done by the means of a variable resistor 75 having a shiftable controller member 75a, the resistor being in series with both of the solenoids 67, 68 whereby to alter the force operating to shift the valve plungers 42c, 43c. Resistor controller 75a might be manually adjusted to various settings corresponding to the speed setting of pump 34 but is preferably interconnected for adjustment with the rate adjusting lever 34a of the pump by any suitable means, diagrammatically indicated by the broken line 75b, operating to reduce the time interval for the operation of the valve plungers as the rate setting of the pump is increased, in such proportion that the lag distance C remains constant for any rate adjustment.

In theory, the time intervals for the lag increments A and B should be adjusted, similarly to lag C, to maintain these increments constant at any speed setting of the pump. This could obviously be done in a manner similar to that just described for the lag distance C, but lag increments $A+B$ are substantially negligible with the controls shown, particularly since the tracer controlled power is relatively small, and if desired these lag increments may be made even smaller by use of well known expedients such, for example, as the use of suitable tracer controlled electronic tube devices as a substitute for the relay switches 65, 70, or by the use of suitable electric or hydraulic bridge type of tracer device, as a substitute for the contact type of tracer here shown, or by an increase of the relative ratio of stylus and contact movements, etc.

Figure 5:
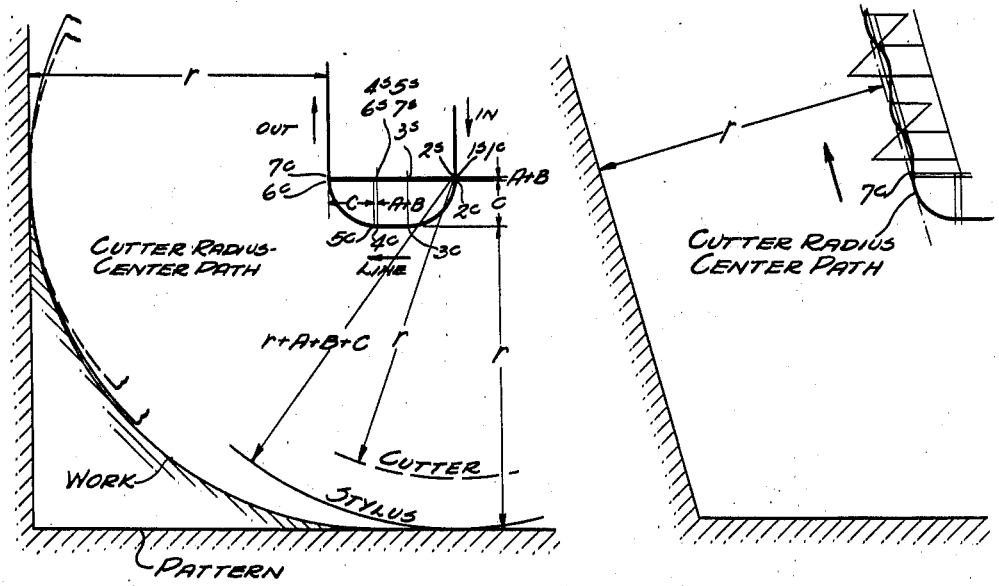

The right hand portion of the diagram Fig. 5 shows the cutter path effected by the transmission and control mechanism of Fig. 3 during a change from maximum to zero "in" speed, such operation being accompanied by a simultaneous change from zero to maximum "line" speed, in part by reason of the described operative interconnection of the outlet throttle valves 42, 43 and in part by reason of the connection of pump 34 to simultaneously supply liquid to both the hydraulic motors 30, 31. It will be understood that for Fig. 8 and the other cutter-path diagrams later described the cutter and stylus paths are superimposed for purposes of comparison, although they are really spaced apart in accordance with the spacing of the cutter 51 and tracer stylus 55, Fig. 1.

At the start of the "in" movement, at the right in Fig. 5, the stylus 55, Fig. 3, is free of the pattern, whereby the tracer "in" contact 60 is closed, the valve 37 is in "in" position and the valve plungers 42c, 43c are in the position closing the "line" outlet port 42b and opening the "in-out" outlet port 43b, as has been described. Such valve positions result in "in" movement at the maximum rate determined by the adjustment of pump 34 since all the pumped liquid is forced to go to piston device 31, and during such movement the tracer stylus contacts the pattern when the stylus and cutter radius centers are at the same in-out level, as shown in Fig. 3 and at the diagram points 1s, 1c, Fig. 5.

The continued "in" movement opens the tracer "in" contact 60, whereby the valve plungers 42c, 43c are shifted as has been described to close outlet port 43b and open the outlet port 42b, thereby decelerating the "in" movement of support 25 to zero speed and accelerating the support 23 to maximum line speed since all the liquid now goes to piston device 30. At the time such deceleration-acceleration starts the cutter radius center has travelled through the lag distance $A+B$ inwardly to the point 2c of the diagram, the stylus radius center having meanwhile been displaced upwardly, relative to the cutter and to the tracer suppport, through the same distance $A+B$, and now standing at the point 2s of the diagram.

At the point 3s, 3c of the diagram, Fig. 5, the closing of the valve port 43b by plunger 43c has been completed, whereby the "in" movement is stopped. At the same time the valve port 42c has been fully opened, whereby the "line" movement is at maximum rate, the stylus radius center having meanwhile been relatively displaced through the total lag distance $A+B+C$, and the cutter now contacting the work at the "in-out" level corresponding to the pattern surface contacted by the stylus at the point 1s. The spacing of the tracer "in" contact 60 and "out" contact 61 is such that the displacement of the stylus as described still leaves the "out" contact open by an amount equivalent to a further stylus movement equal to the tracer lag distance A. The "line" movement therefore will continue at maximum rate until a subsequent control impulse acts on the stylus.

If, during the straight "line" movement which starts, as described, at the points 3s, 3c of the diagram Fig. 5, the tracer stylus contacts a straight "out" pattern surface as shown at the left of the diagram, a straight "out" movement results, as follows:

Assuming that the lateral surface of the stylus contacts the straight "out" pattern surface when the radius centers are at the points 4s, 4c of the diagram Fig. 5 then the further "line" movement through a distance equal to tracer lag distance A displaces the stylus laterally a corresponding distance and, since the tracer contact bar 56 is already displaced vertically a distance corresponding to the total lag distance $A+B+C$ the further lateral displacement of the stylus closes the "out" contact 61, thereby to energize the relay coils 65b and 70b, whereby switches 65 and 70 operate to shift the reverser valve 37 from the "in" position, which was held over during the "line" movement from the previous "in" movement, to "out" position, and to simultaneously start a movement of the valve plungers 42c, 43c for closing the "line" outlet port 42b and opening the "in-out" outlet port 43b.

The resulting simultaneous "out" acceleration and "line" deceleration starts at the points 5s, 5c of the diagram, Fig. 5, and proceeds until the "out" movement is at maximum rate and the "line" movement at zero rate. At this time the cutter radius center has reached the point 6c of the diagram and the movement is straight out. A further straight "out" movement of the cutter to the point 7c of the diagram permits the stylus to return to its normal position with its radius center at the same "in-out" level as the cutter, but it is still displaced laterally by the amount of the total lag distances $A+B+C$. This may or may not be sufficient to maintain the "out" contact 61 closed, but if the contact is open a slight increment of "line" movement will result, sufficient to close the contact for further continued straight "out" movement until the pattern again operates to effect some other result. Moreover, the cone sockets of the members 55c may, if desired, be made of such angle as to insure that the lateral stylus displacement at points 7s, 7c of the diagram is sufficient to establish a closed "out" contact.

If the pattern angle is not straight "out" when the cutter radius reaches the point 7c of the diagram, Fig. 5, or if the "out" angle changes during the described straight "out" movement, the tracer control operates for the cutter to copy the configuration of the pattern. For all outward angles except straight "out" the copying is effected, except where supplemental control means is used as later described, by repeated cycles of alternate "line" acceleration, as shown in the diagrams, Figs. 6 to 10, caused by the opening of the "out" contact 61, Fig. 3, and of "out" acceleration, caused by closing the "out" contact, and the resulting cutter radius center paths consist of alternately oppositely curved portions representing the cutter path during the different half cycles; the opposite curves being smoothly joined except as some of the curves are joined together by straight "line" or straight "out" portions of varying length according to the angle being traced, as shown in the diagrams, Figs. 6 to 11.

Figure 6:
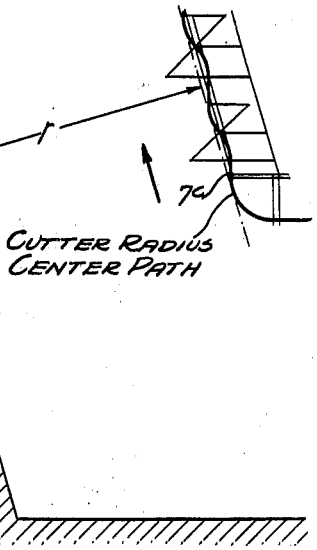
Figure 7:
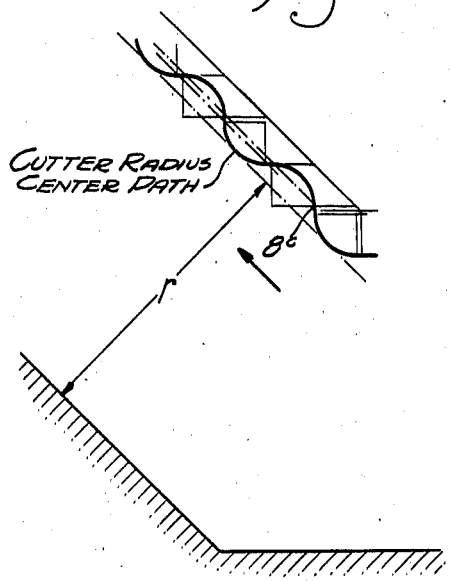
Figure 8:
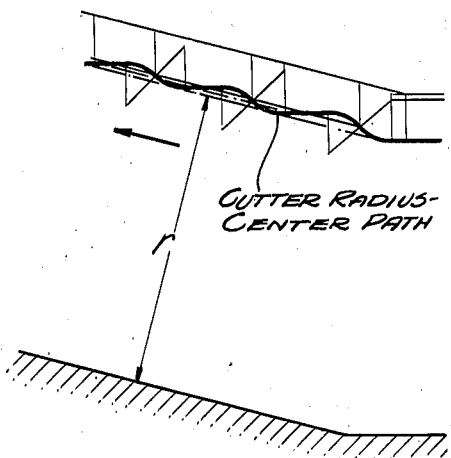

Figs. 6, 7, 8 show such characteristic cutter radius-center paths respectively for 75°, 45° and 15° outward angles. Similar cutter paths result from the control mechanism described when copying corners, as where a straight "out" pattern surface changes to a straight "line" surface, as in Fig. 9. Also for curved surfaces, as shown for the outwardly curved pattern surface of Fig. 10. Inward angles and curves are similarly copied as is shown for the 15° inward angle of Fig. 11, but for all inward angles and curves the cutter path results from alternate "line" and "in" acceleration cycles resulting from the opening and closing of the "in" contact 60, Fig. 3.

The manner in which the curved cutter paths are generated, as in the diagrams Figs. 6 to 11, is explained in detail in said co-pending application and therefore will not be here repeated. It is characteristic of this method of copying that all straight "out," straight "line" and straight "in" pattern surfaces are copied at maximum "out," "line" and "in" speeds respectively, and that for all angular or curved surfaces the cycles of alternate acceleration operate to automatically proportion the average relative rates of movement in the "in-out" and "line" paths to copy the instant angle of the pattern surface. It is also characteristic of this method of copying that for all straight "out" and "line" surfaces, and also for all outward angles and curves, the cutter radius center is positioned correctly for accurately copying the pattern, that is to say, at the cutter radius-center distance $r$ from the work surface which corresponds to the pattern surface, as shown in the diagrams. In other words, for all "line" and outward surfaces the method of copying exactly compensates for the lag involved in the copying control operation, although the actual lag distance, taken either in "line" or in "in-out" direction of movement, is different for each outward angle traced.

For the inward angles and curves the lag is not entirely compensated. This is illustrated in the diagram, Fig. 11, which is for a 15° inward angle, where it is seen that the resulting work surface is oversize with respect to the corresponding pattern surface, the oversize being caused by the lag representing the time required for tracer bar 56 to move from a position adjacent the "out" contact 61 through the distance required to close the "in" contact 60. However, any pattern surface which is copied somewhat oversize as an inward angle or curve for the one direction of "line" movement is accurately copied as an outwardly directed surface during the opposite direction of "line" movement, the surface of Fig. 11, for example, being copied during the opposite "line" movement by a cutter path as in Fig. 8. The result is that all pattern surfaces are accurately copied, substantially irrespective of the value of the total lag distance $A+B+C$, in one or the other "line" direction. Moreover, the total lag distance $A+B+C$ in the present machine may be made very small, as later appears, and any error during the copying of inward angles or curves is, at most, less than the total lag distance.

It will be understood that the diagrams Figs. 5 to 12 are greatly magnified, both as to the size and spacing of the curves of the cutter path. In the present machine the total lag distance $A+B+C$ may be very small, whereby the size and spacing of the curves becomes correspondingly small, because the supports may be decelerated from maximum to zero speed in substantially any desired minimum time, as will now be explained.

When the speed of "line" support 23, for example, is changed from maximum to zero the operation proceeds as follows: The energy represented by the moving mass of the support together with its piston, etc., operates to increase the pressure of the liquid in the outlet channel 42a during the closing of the valve port 42b by the plunger 42c, but since all pressure opposing the closing of the valve port is automatically supplied by the plunger piston 42e, the braking power required to overcome the inertia of the moving mass is automatically provided by the piston in the exact instant amount required. Simultaneous with the deceleration of support 23, the pressure in the supply channel 34b is increased by the inertia forces opposing acceleration of the "in-out" support 25 and associated parts which are forced, by the positive delivery of liquid from pump 34, to accelerate simultaneously with deceleration of line support 23. Such increased pressure in the supply line is transmitted through the "line" piston 30b, to further increase the pressure in the outlet channel 42a, but such increase also operates on the piston 42e to automatically correspondingly assist in the closing of the outlet port for braking the support movement to effect zero speed. Obviously, the smaller the time interval selected for simultaneously stopping support 23 and accelerating support 25, the greater will be the pressure in channel 42a, but since any increase of pressure is automatically balanced, as described, to correspondingly increase the braking effect, the only minimum limit to the time interval required for simultaneously decelerating the support 23 and accelerating support 25 is the limit of pressure which can be carried by the channels subjected thereto. The operation is similar where the support 25 is decelerated and support 23 simultaneously accelerated, but in this case the braking power is automatically furnished by piston 43e.

Moreover, the described braking automatically takes into account any variation in the resistance to the simultaneous deceleration-acceleration control effect. Variations might arise, for example, by reason of a difference in frictional resistance at the different instant support speeds involved in the deceleration-acceleration result, or by differences in the working load at the different instant support speeds, etc. All the factors involved are automatically evaluated and applied for a braking result in exact accordance with the requirements fixed by the rate at which the solenoids 67, 68 operate to shift the throttle plungers 42c, 43c with the result that the solenoids 67, 68 are required to apply only the energy to overcome the inertia and friction of the shifted throttle control parts, including the throttle plungers, in the predetermined time interval. This energy is constant for any given time interval whereby the deceleration-acceleration is effected in the predetermined time interval irrespective of variations in braking resistance.

In any deceleration-acceleration operation such as described, the pressure in the supply channel 34b is increased, as mentioned, in accordance with the inertia resistance and cutting load, etc., opposing the acceleration of the accelerated support. Such pressure increase operates to correspondingly increase the load on pump 34 and motor 32. Since the driving motor is of constant speed type, as stated, the motor output will increase to overcome the extra load imposed by repeated acceleration impulses, such as occur in the diagrams Figs. 5 to 12, and the inertia of the rotating motor armature, etc., will ordinarily be sufficient to prevent any material decrease of motor speed such as might otherwise occur at the start of a series of impulses. Added inertia means may also be provided to avoid initial slowing down of the motor, as by a fly wheel member 77.

From the described braking operation of the outlet throttle control valves 42, 43 it will be seen that the energy expended in any acceleration of either of the supports 23, 25 is utilized to operate the braking means for the same support during any subsequent deceleration thereof, whereby combined acceleration-deceleration requires only about half the energy that would otherwise be required. To this extent the acceleration-deceleration control means operates regeneratively.

In the tracer device of said co-pending application there is provided a tracer supplemental "in" contact which is desirable or necessary for accuracy of copying where the total lag distance $A+B+C$ is relatively large, for reasons there explained. Corresponding supplemental "in" contact means might be used for the control of the present machine and such use is contemplated, but because of the small total lag values available, as explained, in the present mechanism the supplemental "in" controls are not shown. For similar reasons the described interconnection of the resistor 75 and lever 34a may also be unnecessary.

The described arrangement and operation of the valves 42, 43, 47, automatically eliminates any transmission lost motion or slack which might otherwise result in inaccuracy during the copying operations of the diagrams Figs. 5 to 12. The pistons of the supports 23, 25 are continuously maintained in their pattern controlled relative positions, in part by the pressure liquid which interconnects the driving faces of the pistons and in part by the opposition of the outlet liquid pressure on the other faces of the pistons. Both these bodies of liquid are continuously maintained under substantially constant pressure, except as some of the liquid pressure resisting support movement is replaced with equal effect, by the working load opposing support movement, as has been described.

As pointed out in said co-pending application it is sometimes desirable to copy angular surfaces while avoiding the continuous alternate "line" and "in" or "out" acceleration cycles shown in diagrams Figs. 6, 7, 8, 11, whereby to effect the angular copying by a substantially straight cutter path.

Straight-path control mechanism for the copying of angular surfaces is also provided for the present machine. The control mechanism includes a piston device generally indicated as 80, Fig. 3, comprising a piston 80a which is continuously yieldably urged to the right, against an adjustable abutment screw 80b, by the means of a spring 80c. A piston rod 80d projects to strike an adjustable abutment screw 80e, carried by the pivoted control lever 45, during the lever movement in the direction which closes the "in-out" outlet valve 43 and opens the "line" outlet valve 42, and the abutment screws 80b, 80e are adjusted for the abutment of the piston rod end to take place only when the piston 80a has been shifted to the left from its normal position as determined by screw 80b.

Selectively operable means is provided for shifting the piston 80a through an increment of its left hand movement at each cycle of the alternate "line" and "in" or "out" acceleration such as occurs when tracing angles in the diagrams Figs. 6, 11 for example. Thus, a pump device generally indicated as 82, Fig. 3, includes a piston 82a continuously urged in the direction of its suction stroke by a spring 82b, and shiftable in the other direction for effecting a pumping stroke by a solenoid 82c. The circuit of solenoid 82c is in shunt with the solenoid 68, provided a manually operable switch 83 and a normally closed switch 84 are both closed, in which case the pump piston 82a will effect a working stroke each time the solenoid 68 is energized, the pump drawing liquid from any suitable source, such as the reservoir 35 for example, through a one-way valve 82d, and delivering liquid at each pumping stroke to the piston 80a through a one-way valve 82e. The volume pumped per stroke is determined by the adjustment of abutment screws 82f, 82g. Some of the pumped liquid continuously leaks out of the pressure channel through an adjustable needle valve device 84, for reasons later explained.

The switch 84 of the described straight-path control mechanism is normally closed, as stated, by a spring 84a but, provided a manually operable switch 85 is closed, the switch 84 is then opened by a coil 84b whenever the switch 65 is in the position energizing the "in" solenoid 63 of reverser valve 37, and since the switch 65 remains in the "in" position during the tracing of all inward angles, as has been described, it results that, if both the switches 83, 85 are closed the pump 82 will operate for the straight-path effect only during copying of outward pattern angles. On the other hand, if the manual switch 85 is open the switch 84 remains closed and in such case, provided switch 83 is also closed, the described pump operating circuit operates during the copying of both outward and inward pattern angles.

The diagram, Fig. 12, shows a characteristic cutter radius-center path when the supplemental straight-path control is connected for operation, the path in this instance being for a 45° outward angle, the same as shown in Fig. 7, as follows:

It will be noted that for copying any outward angle, as shown by the diagrams Figs. 5 to 12, there is an initial closing of the tracer "out" contact 61, Fig. 3 for effecting the initial "out" acceleration and "line" deceleration required for starting the angular path, as occurs between points 5c, 6c of the diagram Fig. 12. Except for the straight-path control mechanism the initial "out" acceleration would be followed by continuous cycles of alternate "line" and "out" acceleration, as in Fig. 7, brought about by alternate opening and closing of the tracer "out" contact 61, but where pump solenoid 82c operates as described to effect a pumping stroke each time the "out" contact is opened the piston 80a will be gradually shifted to the left Fig. 3 provided the frequency of the pumping strokes is sufficient for the volume of fluid pumped to be greater than the outflow through the needle valve device 84.

In the operation shown by the diagram Fig. 12 a first pumping stroke of pump 82 occurs when the tracer "out" contact 61 opens to energize solenoid 68 for effecting the first "line" acceleration, at about the point 8c of the diagram. The pumped liquid shifts the piston 80a through a first increment of movement to the left with the result that the lever 45 is prevented from movement sufficient to completely close the outlet port 43b, and the "line" acceleration stops at about the point 8cc of the diagram with the cutter traveling at an angle, as indicated at A1, between the diagram points 8cc and 9c. Similar additional increments of movement of piston 80a to the left occur at each start of a "line" acceleration at about the points 10c and 12c of the diagram until, at about the diagram point 12cc, the combined "line" and "out" rates resulting from the progressive limitation of the closing of valve port 43b effects an angular cutter path substantially corresponding to the 45° pattern angle.

When the cutter reaches substantially straight-path movement, as at point 12cc of the diagram Fig. 12 the tracer out contact 61 is open and the solenoid 68 is energized through switch 70, whereby both the solenoid and the spring 80c are urging the piston 80a to the right, Fig. 3. As long as this condition remains there will be no more pumping strokes of the pump 82 and the pressure liquid which opposes the return of piston 80a to the right slowly leaks out through the needle valve device 84, effecting a gradual closing of the valve port 43b, with a corresponding decrease in the rate of the "out" movement and increase in the rate of the "line" movement. The result is that the tracer "out" contact 61 will eventually be closed, whereby to again effect acceleration of the out movement, but a relatively small amount of such "out" acceleration again opens the "out" contact and effects a pumping stroke of pump 82 which shifts the piston 80a to the left sufficiently to again effect the straight-path result. It will be seen that the path of the cutter will not be perfectly straight, but it will be substantially so until the pattern angle is changed.

As has been stated, the amplitude and spacing of the curves of the cutter path are greatly exaggerated in the diagrams. Similarly, in the diagram, Fig. 12, the increase in the angle of the path which occurs at each cycle of "line" acceleration is also exaggerated. The successive "line" acceleration intervals, however, occur rapidly at the start of the copying of any angular surface and the straight-path condition, such as starts at the point 12cc of the diagram Fig. 12, is quickly established. Once established, the path is maintained of substantially straight-path nature by the occasional closing of the "out" contact 61 as described, the cutter path curves which result therefrom being at comparatively large spacing and of an amplitude only slightly more than sufficient to effect the opening and closing of the contact.

It is to be noted that any restriction to movement of the outlet control valves 42, 43 which may be set up by the straight-path control mechanism does not affect the normal accuracy of copying when the pattern direction is suddenly changed. During the straight-path copying of the 45° outward angle of Fig. 12, for example, the stylus is displaced sufficiently that the "out" contact 61, Fig. 3, is open substantially only the equivalent of the lag distance A, and if straight "out" movement were suddenly demanded by the pattern the lateral contact of the stylus with the pattern surface will close the "out" contact with a minimum of stylus movement, with the result that the outlet valve port 42b will close and port 43b will open to its maximum speed position whereby to stop the "line" movement and effect maximum out speed as described for Fig. 5, except that the total lag involved in obtaining maximum "out" movement is less because the "out" support is already moving, instead of being initially at zero speed as in Fig. 5.

If the increased angle is less than a straight

"out" angle there will be a few cycles of alternate "out" and "line" acceleration at the start of the increased angle, similar to the start of the angle of Fig. 12, except that the amplitude of the cutter path curves will be smaller, and the straight-path result will then resume for copying the new angle.

If, instead, the pattern angle of Fig. 12 were suddenly decreased, the resulting copying would also be accurate. The straight-path movement proceeds, as described, with the "out" contact open and if the angle of the pattern became smaller the first result would be to open the contact still farther. There would result a period during which the restriction to the closing of the valve port 43b, whereby to increase the rate of "line" movement, modified the operation of the controls. However, the decreased angle effects a hump or corner which, by reason of the radius of the stylus and cutter, requires a certain time interval for the turning of the corner, as for example in the diagram Fig. 9. It is unnecessary for the copying to be accurate during such interval, especially since the cutter has initially moved outside the required work line. During such turning of the corner there will be no pumping strokes from pump 82 until sufficient liquid has leaked from needle valve device 84 for a decrease of "out" speed and simultaneous increase of "line" speed sufficient for closing the "out" contact, but this will occur before the turning of the corner is completed and the new angle will then be copied, starting with a few cycles of alternate "out" and "line" acceleration, by the straight-path method described for Fig. 12.

Where the control mechanism is adjusted, as described, for operation of the straight-path control during copying of inward angles as well as outward angles, the inward angles are copied in the same manner as described for the operation of Fig. 12, except that the increments of adjustment of the piston 80a apply to gradually increase the inward angle, instead of the outward angle, until the cutter path is following the instant inward angle with substantially straight path movement. Similarly, as for outward angles, the restriction set up by the straight path control for inward angles does not limit the accuracy of copying when the pattern angle changes.

The described straight-path control constitutes a method of damping the amplitude of the curves of the cutter paths Figs. 6 to 12, by a damping mechanism which effects the straight-path control while leaving the control mechanism free to respond with normal accuracy to any change in the pattern angle. The damping automatically disappears unless automatically maintained, as described, for the purposes intended.

As explained in said co-pending application, no surface copied by a straight-path control method can be entirely accurate because any such control interferes somewhat with the complete compensation for lag. This normally causes the cutter to cut somewhat outside the intended work line as is diagrammatically shown in Fig. 12, but instead of the error being all outside the intended work surface, as there shown, it may be distributed partly above and partly below the line of accurate copying by the expedients described in said co-pending application. For the present machine, however, since the total lag distance may be very small, as has been pointed out, such straight-path error is negligible.

Mechanical transmission mechanism may be used for driving the "in-out" and "line" supports 23, 25, instead of the hydraulic transmission mechanism of Fig. 3, while still retaining the operating and control characteristics of the invention.

Figure 4:
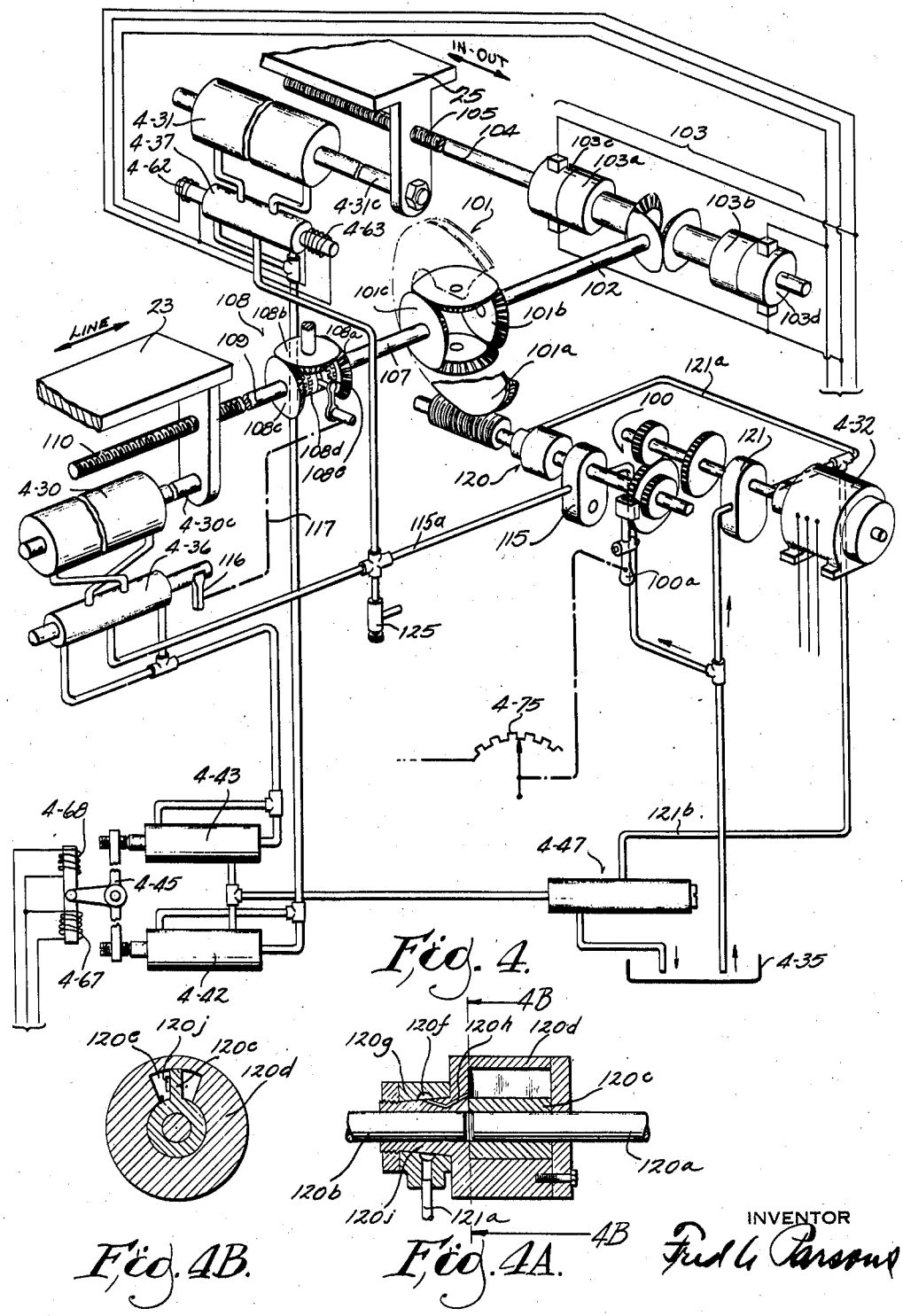
Figure 4 is a diagrammatic view of a modified form of transmission and control mechanism for the machine of Fig. 1 in which the transmission is mechanical.

Thus, referring to Fig. 4, the supports 23, 25 are both driven from the constant speed motor 4—32 through a rate change device 100 of any suitable well known type, having an adjustable controller lever 100a. Rate changer 100 drives the gear 101a of a differential device 101 of any type suitable for actuating the differential output gears 101b, 101c in such manner that either output gear may be actuated at any speed between a maximum speed, determined by the adjustment of rate changer 100, and zero speed.

The differential output gear 101b the "in-out" support 25 through a shaft 102, an electric-clutch type of reverser generally denoted as 103, a shaft 104, and suitable screw and nut means including a screw 105. The reverser 103 includes clutch members 103a, 103b oppositely driven from shaft 102, as through the bevel gears shown, and rotatably carried on the shaft 104; and also includes electro-magnetic clutch members 103c, 103d fixed on the shaft 104 and respectively adapted to be driven from the clutch members 103a, 103b when suitable magnetizing coils, not shown, are energized, the coils being carried by the respective clutch members and alternatively energized through suitable brushes, whereby to be tracer controlled for "in" or "out" engagement of the clutches in the same manner as described for the alternative energizing of the coils 62, 63, of the "in-out" reverser valve 37, Fig. 3.

The differential output gear 101c drives the "line" support 23 through a shaft 107, a reverser 108, a shaft 109, and screw and nut means including a screw 110. The reverser 108 includes a clutch gear 108a fixed on the shaft 107, and a clutch gear 108c rotatably carried on shaft 109 to be driven in opposite direction to the gear 108a through a gear 108b. The inner faces of each of the gears 108a, 108c are provided with clutch teeth, there being a clutch spool 108d slidably splined on shaft 109 and having its end faces provided with clutch portions respectively engageable with the different clutch gears. The clutch spool 108d may be shifted for alternative engagement with either clutch gear by a pivoted lever 108e having an end portion engaging a suitable annular groove in the spool. The pivoted reverser lever 108e is provided with suitable means for the manual and dog-operated control thereof in the same manner as for the reverser valve 36, Fig. 3, and since such control means may be identical with that shown in Fig. 3 it is not shown.

The described transmission of Fig. 4 operates in all essential particulars similarly to the hydraulic transmission of Fig. 3. The differential device 101 is indifferent as to which of the output gears 101b, 101c receives motion from cage gear 101a whereby the transmission will drive either support 23, 25 at any speed, with certain limitations corresponding to the limitations of the transmission of Fig. 3. Thus, either support may be driven at a maximum rate determined by the rate changer 100, in which case the rate of the other support is zero, and either support may have any rate intermediate between the zero and maximum rates, provided the sum of the rates is constant, as determined by the rate changer. Also, if the rate of either support is decelerated, as by the control mechanism later described, the other support will be correspondingly accelerated, and vice versa. It is to be noted that the mechanical differential might, under certain conditions, permit either output gear to pass through the zero speed into reverse or negative speed, which would be objectionable, but this is prevented by the control of the movements by the brakes, later described, which limit the range of support movement between maximum and zero in one direction only.

The mechanical transmission of Fig. 4 is controlled for copying operations by the means of tracer controlled brake devices in a manner corresponding to the described control mechanism for the transmission of Fig. 3. In the present instance hydraulic brake devices are used for the transmission control, Fig. 4, substantially the same as described for Fig. 3 and similarly operative for the control of the relative rates of supports 23, 25 and for eliminating lost motion in the transmission; and for convenience, where the members or units may be of identical construction, the same identification characters used in Fig. 3 have been applied in Fig. 4, but with the prefix 4.

A piston device 4—30, Fig. 4 is rigidly connected by piston rod 4—30c for its piston to move with the "line" support 23 and receives pressure liquid through a supply channel 115a from a pump 115 that is driven from the motor 4—32 through the rate changer 100, the pressure direction of the liquid received from the pump being determined by a reverser valve 4—36 controlled by a pivoted lever 116, there being suitable means interconnecting the lever 116 for movement with the line reverser lever 108e, as diagrammatically indicated by the dotted line 117, for the pressure of liquid from pump 115 to urge the support 23 in the same direction as does the screw 110 in either direction effect of reverser 108.

Similarly, a piston device 4—31, Fig. 4, is rigidly connected by piston rod 4—31c for its piston to move with the "in-out" support 25, and receives pressure liquid from the pump 115, the pressure direction of the liquid received from the pump being controlled by a reverser valve 4—37 controlled by solenoids 4—62, 4—63 which are interconnected as shown in Fig. 4, with the circuit of the electric clutches comprising the reverser 103 for the liquid from pump 115 to urge the support 25 in the same direction as does the screw 105, in either direction effect of the reverser 103.

Similarly to the control mechanism of Fig. 3, the valves 4—36 and 4—37, Fig. 4, operate in either direction of the associated supports for the outlet fluid from their respective piston devices to be controlled by outlet throttle valve devices 4—42 and 4—43 respectively, and by a back pressure valve 4—47, through which the liquid passes from both piston devices, after first passing through the one or the other outlet throttle valve. Also, the plungers of the outlet throttle valves 4—42 and 4—43 are interconnected by a pivoted lever 4—45 for operation by tracer controlled solenoids 4—67, 4—68 in the manner explained for the valves of Fig. 3. The construction and control of the valves 4—42, 4—43 being identical with the valves 42, 43, the valves of Fig. 4 operate as brakes for determining the tracer controlled relative speeds of the supports 23, 25 exactly as do the valves of Fig. 3.

The control and effect of the back-pressure valve 4—47, Fig. 4, is similar to that of the valve 47 of Fig. 3, but for Fig. 4 the pressure fluid for automatic operation of the valve, whereby to reduce the back-pressure in accordance with an increase in working load on the supports, is controlled from a torque responsive device 120 located in the train which connects the rate changer 100 with the differential device 101.

Thus, referring to Figs. 4, 4A, 4B the torque responsive device 120 is similar to torque responsive devices shown in said co-pending application and also in another application Serial No. 327,275 filed April 1, 1940. The driving connection from rate changer 100 to differential device 101 includes a driving portion 120a and a driven portion 120b. A rotary piston member 120c is fixed with the driver portion 120a and has a limited rotation within a cylinder member 120d which is fixed with the driven portion 120b, whereby the portion 120a drives the portion 120b through a coupling formed by the cylinder and piston members. The cylinder chamber 120e is arranged on the driving side of the piston element 120c and receives the pressure liquid output of a pump 121 through a suitable channel connection such as a pipe 121a, an annular groove 120f within the bore of a non-rotatable pressure liquid coupling member 120g and a channel 120h within the cylinder member 120d, the cylinder member having an extension sleeve 120i forming a complementary pressure liquid coupling member rotatably fitted in the bore of the stationary coupling member 120g.

The pump 121 is driven at constant speed from motor 4—32. Suitable safety relief valve means, not shown, is contemplated for the release of liquid from the output channel 121a of the pump but, other than such safety means, the liquid from pump 121 has no outlet except through an outlet opening 120j suitably positioned in a wall of the cylinder chamber 120c, the arrangement being such that any torque resistance of shaft portion 120b tends to close off the opening, whereby the liquid can escape from pump 121 only after it has forced a relative rotation of the piston and cylinder members sufficient to expose the opening against whatever instant torque is operating to drive the differential device 101. With this arrangement the pressure of the liquid in the channel 121a varies instantly with any variations in the torque resistance to actuation of the differential device.

Such torque responsive pressure variations are transmitted from the pressure channel 121a, Fig. 4, to the outlet pressure control valve 4—47 through a connecting channel 121b, and serve to control the operation of the valve to reduce the instant back-pressure set up on the piston devices 4—30 and 4—31 of Fig. 4 in the same manner as the described back-pressure control by valve 47 of Fig. 3, that is to say the back-pressure is controlled to be relatively high when no working load opposes the movement of supports 23, 25 and to be reduced as the working load on the supports 23, 25 is increased, and vice versa, whereby, as described for the mechanism of Fig. 3, to automatically eliminate all lost motion and slack in the transmission and to maintain the supports rigidly in the pattern controlled position. In this instance, however, the automatically maintained forward pressure operates through the screws 105, 110 and the back pressure applied by the piston devices 4—30 and 4—31 operates to continuously eliminate lost motion and slack in all the mechanical transmission parts interconnecting between the supports 23, 25, including any lost motion otherwise present in the nut devices for the screws. It results that the pump 115 operates at low pressure, and being driven through rate changer 110 it may operate at constant volume, preferably somewhat more than is required to maintain the piston devices 4—30, 4—31 filled with fluid, and with the excess of pumped liquid cast off through a suitable low pressure relief valve 125. The operation of the reversers 108, 103 does not interfere with the automatic elimination of lost motion and slack, particularly since the method of copying does not require operation of either of them at a time when the copying accuracy could be affected thereby.

It will be understood that for the pattern controlled operation of the transmission of Fig. 4, there is provided a tracer device such as the device 27 of Fig. 3, together with its associated power source 71 and control switches 65, 70, but since the connections therefor are the same as in Fig. 3, and will be obvious these control parts are not shown in Fig. 4. The straight-path control mechanism, described for the mechanism of Fig. 3, is also applicable to the mechanism of Fig. 4, as will be apparent.

For either the transmission of Fig. 3 or of Fig. 4 the outlet throttle valves 42, 43 or 4—42, 4—43 may be replaced by a modified throttle valve construction shown in Fig. 3A. In the structure of Fig. 3A the separate throttle plungers of Figs. 3, 4 are combined in a single plunger having plunger portions 42c' and 43c' respectively operative to close the outlet ports 42b', 43b' in the opposite directions of plunger movement, and arranged in such manner that the one port is opened when the other is closed. For each plunger portion any liquid pressure opposing the closing of the associated port is balanced by the piston areas 42c or 43c, whereby the instant liquid pressures are balanced in any position of the throttle and the throttles may be tracer controlled, in the manner explained for the structure of Fig. 3, by the solenoids 67' and 68', respectively corresponding to the solenoids 67 and 68 of Fig. 3. The single plunger of Fig. 3A may also be controlled for effecting straight-path copying of pattern angles, as described for Fig. 3, the portion 80' representing the end of the piston rod of a piston device 80, Fig. 3, such as would be used for the straight-path control.

It will be noted that each of the mechanisms of Figs. 3, 4, while previously described in an organization particularly directed to copying machines, have various aspects which may be applied in simplified or modified form to a variety of machine tools.

Thus, for example, inspection of various of the tool path diagrams Figs. 5 to 12 discloses that the throttle-brake devices are controlled for effecting various support rates, ranging from zero rate to the maximum rate available from the driving mechanism. Except as a support is operating at either the zero rate or the maximum rate, the various rates of each support are primarily determined by cyclic adjustment of its throttle-brake device, for effecting alternate half cycles of acceleration and deceleration of the rate of the support movement suitably controlled for a desired average rate during each cycle, the average rate being effected by maximum and minimum rates respectively above and below the average rate. This has certain advantages, particularly where the energy required for accelerating the support during the one half-cycle is regeneratively utilized for its subsequent deceleration, as has been described. Moreover, the cyclic deceleration-acceleration may be substantially eliminated after a few cycles, while maintaining the required rate, as by the supplemental straight-path control means described for the copying of pattern angles.

What is claimed is:

1. In a machine tool the combination of a support movable for effecting relative movement of a tool and a work piece, hydraulic means for urging said support movement and including a hydraulic motor having an outlet channel, an adjustable outlet throttle device associated with said motor outlet channel for opposing said support movement, control means for movement of said support at an average rate less than the maximum rate available from said hydraulic means including power means for repeated cyclic adjustment of said throttle device alternately to positions respectively effective for support rates higher and lower than said average rate, and means controlling said power means for the average rate during each cycle of a series of cycles of said adjustment to correspond with said average rate.

2. In a machine tool, the combination of a support movable for effecting relative movement of a tool and a work piece, transmission means operable for urging said support movement, adjustable brake means for opposing said support movement, control means for movement of said support at an average rate less than the maximum rate available from said transmission means including power means for repeated cyclic adjustment of said brake means alternatively to positions respectively effective for rates higher and lower than said average rate, and means controlling said power means for the average rate during each cycle of a series of cycles of said adjustment to correspond with said average rate.

3. In a machine tool the combination of a support movable for effecting relative movement of a tool and a work piece, hydraulic means for urging said support movement and including a hydraulic motor having an outlet channel, an adjustable outlet throttle device associated with said motor outlet channel for opposing said support movement, control means for movement of the support at an average rate less than said maximum rate available from said hydraulic means including power means for repeated cyclic adjustment of said throttle device alternately to positions respectively effective for rates higher and lower than said average rate, and means controlling said power means for the average rate during each cycle of a series of cycles of said adjustment to correspond with said average rate, said power means including a piston device for urging said throttle device in a direction increasing the throttling effect thereof and connected to receive pressure liquid from said outlet channel at a point between the throttle device and asid motor.

4. In a machine tool, the combination of a support movable for effecting relative movement of a tool and a work piece, transmission means operable for urging said support movement, adjustable brake means for opposing said support movement, control means for movement of said support at an average rate less than the maximum rate available from said transmission means including power means for repeated cyclic adjustment of said brake means alternately to positions respectively effective for rates higher and lower than said average rate, and means controlling said power means for the average rate during each cycle of a series of cycles of said adjustment to correspond with said average rate, said power means including a power connection operative to receive from said support during each cyclic deceleration of the support an instant energy corresponding to the loss of energy by the support during the same instant and connected to apply said energy to the braking adjustment of said brake.

5. In a machine tool the combination of a support movable for effecting relative movement of a tool and a work piece, hydraulic means for urging said support movement and including a hydraulic motor having an outlet channel, an adjustable outlet throttle device associated with said motor outlet channel for opposing said support movement, control means for movement of said support at an average rate less than the maximum rate available from said hydraulic means including power means for repeated cyclic adjustment of said throttle device alternatively to positions respectively effective for rates higher and lower than said average rate, means controlling said power means for the average rate during each cycle of a series of cycles of said adjustment to correspond with said average rate, and supplemental control means successively limiting the adjustment of said throttle device during successive cycles of said cyclic adjustment thereof in a manner such that repeated cycles result in a substantially constant support rate substantially corresponding to said average rate.

6. In a machine tool, the combination of a support movable for effecting relative movement of a tool and a work piece, transmission means operable for urging said support movement, adjustable brake means for opposing said support movement, control means for movement of said support at an average rate less than the maximum rate available from said transmission means including power means for repeated cyclic adjustment of said brake means alternately to positions respectively effective for rates higher and lower than said average rate, means controlling said power means for the average rate during each cycle of a series of cycles of said adjustment to correspond with said average rate, and supplemental control means successively limiting the adjustment of said brake means during successive cycles of said cyclic adjustment thereof in a manner such that said repeated cycles result in a substantially constant support rate substantially equal to said average support rate.

7. In a copying machine, the combination of two supports respectively movable in different mutually angular paths for effecting relative movement of a tool and a work piece, transmission mechanism for said support movement including two hydraulic motors respectively for the different supports and each having an outlet channel, a plurality of outlet throttle devices respectively associated with the outlet channel of the different motors and each adjustable for increasing or decreasing the throttling effect thereof, power means for adjusting said throttle devices, and pattern controlled tracer means operatively controlling said power means to effect various relative rates of movement of said supports for said tool to copy the contour of the pattern on said work piece.

8. In a copying machine, the combination of two supports respectively movable in different mutually angular paths for effecting relative movement of a tool and work piece, transmission means for said support movement, two brake devices respectively for opposing the movement of the different supports by said transmission means and each adjustable for increasing or decreasing the braking effect thereof, power means for adjustment of said brake devices, and pattern controlled tracer means operatively controlling said power means to effect various relative rates of movement of said supports for said tool to copy the contour of the pattern on said work piece.

9. In a copying machine, the combination of two supports respectively movable in different mutually transverse paths for effecting relative movement of a tool and a work piece, transmission means for said support movement, a plurality of hydraulic brake means respectively for opposing the movement of the different supports and each including a cylinder and piston device providing an outlet channel together with an adjustable outlet throttle device associated with the outlet channel, power means for adjustment of the throttle device of each of said outlet channels for increasing or decreasing the throttling effect thereof, and pattern controlled tracer means operatively controlling said power means to effect various relative rates of movement of said supports for said tool to copy the contour of the pattern on said work piece.

10. In a copying machine, the combination of two supports respectively movable in different mutually transverse paths for effecting relative movement of a tool and a work piece, transmission means for said support movement, a plurality of hydraulic brake means respectively for opposing the movement of the different supports and each including a cylinder and piston device providing an outlet channel together with an adjustable outlet throttle device associated with the outlet channel, power means for adjustment of the throttle device of each of said outlet channels for increasing or decreasing the throttling effect thereof, and pattern controlled tracer means operatively controlling said power means to effect various relative rates of movement of said supports for said tool to copy the contour of the pattern on said work piece, said adjustable throttle devices each including piston means connected for receiving pressure liquid from the associated outlet channel and operative for automatically balancing the throttle device against the pressure of the outlet liquid otherwise acting to urge adjustment of the device in a direction decreasing the throttling effect thereof.

11. In a copying machine, the combination of two supports respectively movable in different mutually angular paths for relative movements of a tool and a work piece, transmission means for said support movement at various relative support rates, two brake devices respectively for opposing the movement of the different supports by said transmission means and each adjustable for increasing or decreasing the braking effect thereof, power means for adjustment of said brake devices, and pattern controlled tracer means for said brake means to effect various relative rates of movement of said supports for said tool to copy the contour of the pattern on said work piece; said power means including two power devices controlled from said tracer device for selective determination of the one or the other of said supports to be decelerated by its associated brake device and also including two other power devices respectively for the different brake devices and each automatically operative to apply to its associated brake device during braking operation thereof a braking energy derived from the deceleration of the associated support, whereby power expended in a previous acceleration of the decelerated support is regeneratively utilized for deceleration thereof.

12. In a copying machine, the combination of two supports respectively movable in different mutually angular paths for effecting relative movement of a tool and a work piece, transmission means for said support movement at various relative support rates, two brake devices respectively for opposing the movement of the different supports and each adjustable for increasing or decreasing the braking effect thereof, power means for adjustment of said brake devices, and pattern controlled tracer means operatively controlling said power means for alternative increase of braking effect in the different brake devices whereby to effect alternate deceleration of the rate of the different supports for said tool to copy the contour of the pattern on said work piece; said power means including a power connection operative to automatically supply to each brake device during braking adjustment thereof an instant braking energy substantially corresponding to the energy required for the support deceleration effected during the same instant.

13. In a copying machine, the combination of two supports respectively movable in different mutually angular paths for effecting relative movements of a tool and a work piece, transmission mechanism for said support movement including two hydraulic motors respectively for movement of the different supports and each having an outlet channel, a plurality of outlet throttle devices respectively associated with the outlet channel of the different motors and each adjustable for increasing or decreasing the throttling effect thereof, power means for adjusting said throttle devices, and pattern controlled tracer means operatively controlling said power means to effect various relative rates of movement of said support for said tool to copy the contour of the pattern on said work piece, said power means including a plurality of piston devices respectively associated with different of said throttle devices and connected to receive pressure liquid from the associated outlet channel for automatically balancing the throttle device against the pressure of the outlet liquid otherwise acting to urge adjustment of the throttle device in a direction decreasing the throttling effect thereof.

14. In a copying machine, the combination of two supports respectively movable in different mutually angular paths for effecting relative movements of a tool and a work piece, transmission means for said support movement, two brake devices respectively for opposing the movement of the different supports by said transmission means and each adjustable for increasing or decreasing the braking effect thereof, power means for adjustment of said brake devices, pattern controlled tracer means operatively controlling said power means to effect various relative rates of movement of said supports for said tool to copy the contour of the pattern on said work piece, other means continuously opposing the movement of said supports, and means controlling said other opposing means for altering the opposing effect thereof in accordance with variations in the power required to drive said transmission means.

15. In a copying machine, the combination of two supports respectively movable in different mutually angular paths for effecting relative movements of a tool and a work piece, transmission mechanism for said support movement including two hydraulic motors respectively for movement of the different supports and each having an outlet channel, a plurality of outlet throttle devices respectively associated with the outlet channel of the different motors and each adjustable for increasing or decreasing the throttling effect thereof, power means for adjusting said throttle devices, pattern controlled tracer means operatively controlling said power means to effect various relative rates of movement of said supports for said tool to copy the contour of the pattern on said work piece, other adjustable throttle means associated with the motor outlet channels, and means connecting the last mentioned throttle means for adjustment decreasing the throttling effect thereof as the power load on said transmission mechanism is increased and vice versa.

16. In a copying machine, the combination of two supports respectively movable in different mutually angular paths for effecting relative movement of a tool and a work piece, transmission means for said support movement, two brake devices respectively for opposing the movement of the different supports by said transmission means and each adjustable for increasing or decreasing the braking effect thereof, power means for adjusting either of said brake devices to increase the braking effect thereof while simultaneously adjusting the other brake device to decrease its braking effect, and pattern controlled tracer means operatively controlling said power means to effect various relative rates of movement of said supports for said tool to copy the contour of the pattern on said work piece.

17. In a copying machine, the combination of two supports respectively movable in different mutually angular paths for effecting relative movement of a tool and a work piece, transmission mechanism for said support movement including two hydraulic motors respectively for the different supports and each having an outlet channel, a plurality of outlet throttle devices respectively associated with the outlet channel of the different motors and each adjustable for increasing or decreasing the throttling effect thereof, power means for adjusting either of said throttle devices to increase the throttling effect thereof while simultaneously adjusting the other throttle device to decrease its throttling effect, and pattern controlled tracer means operatively controlling said power means to effect various relative rates of movement of said supports for said tool to copy the contour of the pattern on said work piece.

18. In a copying machine, the combination of two supports respectively movable in different mutually angular paths for effecting relative movements of a tool and a work piece, transmission means for said support movement, two brake devices respectively for opposing the movement of the different supports by said transmission means and each adjustable for increasing or decreasing the braking effect thereof, means operatively controlling said brake devices for the adjustment of either device for increasing the braking effect thereof to be simultaneous with the adjustment of the other device for decreasing its braking effect and vice versa, power means for adjustment of said brake devices, and pattern controlled tracer means operatively controlling said power means to effect various relative rates of movement of said supports for said tool to copy the contour of the pattern on said work piece.

19. In a copying machine, the combination of two supports respectively movable in different mutually angular paths for effecting relative movements of a tool and a work piece, transmission mechanism for said support movement including two hydraulic motors respectively for the different supports and each having an outlet channel, a plurality of outlet throttle devices respectively associated with the outlet channel of the different motors and each adjustable for increasing or decreasing the throttling effect thereof, and control means for effecting repeated cycles of alternate deceleration of the different supports in each cycle of which the deceleration of the one support is simultaneously accompanied by acceleration of the other support including power means operable for the adjustment of said throttle devices, said control means also including pattern controlled tracer means operatively controlling said power means for effecting said cyclic support deceleration to cause said tool to copy various pattern surfaces angularly disposed relative to both said support paths.

20. In a copying machine, the combination of two supports respectively movable in different mutually angular paths for effecting relative movements of a tool and a work piece, transmission means for said support movement, two brake devices respectively for opposing the movement of the different supports by said transmission means and each adjustable for increasing or decreasing the braking effect thereof, and control means for said transmission means for effecting repeated cycles of alternate deceleration of the different supports in each cycle of which the deceleration of the one support is simultaneously accompanied by acceleration of the other support including power means of adjusting said brake devices, said control means also including tracer means operatively controlling said power means to effect said cyclic deceleration under the control of a pattern surface angularly disposed relative to both said support paths, said control means effecting during each cycle of said alternate deceleration an average rate of movement of each support substantially corresponding to the relative support rate required for said tool to copy said pattern angle on the work piece with the supports moving at constant rate.

21. In a copying machine, the combination of two supports respectively movable in different mutually angular paths for effecting relative movements of a tool and a work piece, transmission mechanism for said support movement including two hydraulic motors respectively for the different supports and each having an outlet channel, a plurality of outlet throttle devices respectively associated with the outlet channel of the different motors and each adjustable for increasing or decreasing the throttling effect thereof, and control means for said transmission mechanism for effecting repeated cycles of alternate deceleration of the different supports in each cycle of which the deceleration of the one support is simultaneously accompanied by acceleration of the other support including power means for adjusting said throttle valves, said control means also including tracer means operatively controlling said power means under the control of a pattern surface angularly disposed relative to both said paths, said control means effecting during each cycle of said alternate deceleration an average rate of movement of each support substantially corresponding to the relative support rate required for said tool to copy said pattern angle on the work piece with the supports moving at constant speed.

22. In a copying machine, the combination of two supports respectively movable in different mutually angular paths for effecting relative movements of a tool and a work piece, transmission means for said support movement, two brake devices respectively for opposing the movement of the different supports and each adjustable for increasing or decreasing the braking effect thereof, control means including power means operative for operation of said brake devices for effecting repeated cycles of alternate deceleration of the different supports in which the deceleration of the one support is simultaneously accompanied by acceleration of the other support, said control means also including tracer means operatively controlling said power means under the control of a pattern surface angularly disposed relative to both said support paths, said control means effecting during each cycle of said alternate deceleration an average rate of movement of each support substantially corresponding to the relative support rate required for said tool to copy said pattern angle on the work piece with the supports moving at constant rate, and supplemental control means for said power means including means operative during each cycle of said alternate deceleration to limit the maximum rate to which one of said supports is accelerated in a manner such that repeated increments of limitation during a series of said cycles limits the last mentioned support to a substantially constant rate substantially corresponding to said constant rate required for the tool to copy the pattern angle.

23. In a copying machine, the combination of two supports respectively movable in different mutually angular paths for effecting relative movements of a tool and a work piece, transmission means for said support movement, two brake devices respectively for opposing the movement of the different supports and each adjustable for increasing or decreasing the braking effect thereof, control means including power means operative for operation of said brake devices for effecting repeated cycles of alternate deceleration of the different supports in each cycle of which the deceleration of the one support is simultaneously accompanied by acceleration of the other support, said control means also including tracer means operatively controlling said power means under the control of a pattern surface angularly disposed relative to both said support paths, said control means effecting during each cycle of said alternate deceleration an average rate of movement of each support substantially corresponding to the relative support rate required for said tool to copy said pattern angle on the work piece with the supports moving at constant rate, supplemental control means for said power means including means operative during each cycle of said alternate deceleration to limit the maximum rate to which one of said supports is accelerated in a manner such that repeated increments of the limitation during a series of said cycles limits the last mentioned support to a substantially constant rate substantially corresponding to said constant rate required for the tool to copy the pattern angle, and manually adjustable control means for said supplemental control means having different adjustment positions respectively determinative of operation of the supplemental control means irrespective of the inward or outward direction of said pattern angle and determinative of the operation of said supplemental control means only for outward pattern angles.

24. In a copying machine the combination of two supports respectively movable in different mutually angular paths for effecting relative movements of a tool and a work piece, transmission mechanism for movement of each of said supports at a variety of rates including a zero rate and a predetermined maximum rate and various intermediate rates, two brake devices respectively adjustable for effecting deceleration of the rate of the different supports, power means for adjustment of said brake devices, pattern controlled tracer means operatively controlling said power means to effect change of rate of movement of said supports for said tool to copy the contour of the pattern on said work piece including a change from maximum to zero rate for one of said supports, and means operatively controlling said power means for establishing a predetermined time interval for the operation of said brake devices to effect said change from maximum to zero rate.

25. In a copying machine the combination of two supports respectively movable in different mutually angular paths for effecting relative movements of a tool and a work piece, transmission mechanism for movement of each of said supports at a variety of rates including a zero rate and a maximum rate and various intermediate rates, said transmission mechanism including rate change means adjustable for effecting different values of said maximum rate, two brake devices respectively adjustable for effecting deceleration of the rate of the different supports, power means for adjustment of said brake devices, pattern controlled tracer means operatively controlling said power means to effect change of rate of movement of said supports for said tool to copy the contour of the pattern on said work piece including a change from maximum to zero rate for one of said supports, and means operatively controlling said power means for establishing a predetermined time interval for the operation of said brake devices to effect said change from maximum to zero rate including a device adjustable to maintain said time interval at said predetermined value at various adjustments of said rate change means.

26. In a copying machine the combination of two supports respectively movable in mutually angular line and in-out paths for effecting relative movement of a tool and a work piece, transmission means for said support movement including reversing means alternatively adjustable for in or out direction of movement in said in-out path, two brake devices respectively for opposing the movement of said supports in different of said paths and each adjustable for increasing or decreasing the braking effect thereof, power means for adjustment of said reversing means and of said brake devices, and pattern controlled tracer means operatively controlling said power means to control said support movements for said tool to copy the contour of the pattern on said work piece, said tracer means including elements relatively movable under the control of said pattern between first and second relative positions respectively controlling said power means for effecting an in and an out direction adjustment of said reverser means and each controlling said power means for increasing the braking effect of said line path brake device while simultaneously decreasing the braking effect of said in-out path brake device.

27. In a copying machine, the combination of two supports respectively movable in different mutually angular line and in-out paths for effecting relative movement of a tool and a work piece, transmission mechanism for said support movement including two hydraulic motors respectively for the line and in-out path supports and each having an outlet channel, said transmission including reversing means for alternative in or out directicon of actuation of said in-out path support motor, two outlet throttle devices respectively associated with the outlet channel of the line and in-out path support motors and each adjustable for increasing or decreasing the throttling effect thereof, power means for said adjustment of said reversing means and of said outlet throttle devices, and pattern controlled tracer means controlling said power means to control said support movements for said tool to copy the contour of the pattern on said work piece, said tracer means including elements relatively movable under the control of said pattern between first and second relative positions respectively controlling said power means for said reverser means to effect an in and an out direction of actuation of said in-out path support motor and each controlling said power means for increasing the throttling effect of said line path motor outlet throttle device while simultaneously decreasing the throttling effect of said in-out path motor throttle device.

28. In a copying machine, the combination of two supports respectively movable in different mutually angular paths for effecting relative movement of a tool and a work piece, transmission means for said support movement at various relative support rates, means associated with said transmission means for maintaining the instant sum of the rates of said supports at substantially a constant combined support rate value, two adjustable brake devices respectively for opposing the movement of the different supports by said transmission means, power means for adjustment of said brake devices, and pattern controlled tracer means operatively controlling said power means for said brake means to effect various relative rates of movement of said supports for said tool to copy the contour of the pattern on said work piece.

29. In a copying machine, the combination of two supports respectively movable in different mutually angular paths for effecting relative movement of a tool and a work piece, transmission mechanism for said support movement including two hydraulic motors respectively for the different supports and each having an outlet channel, a plurality of outlet throttle devices respectively associated with the outlet channel of the different motors and each adjustable for increasing or decreasing the throttling effect thereof, pressure liquid supply means adapted to supply a substantially predetermined volume of liquid to said two motors irrespective of the relative motor speeds, power means for adjustment of said throttle devices, and pattern controlled tracer means operatively controlling said power means to effect various relative rates of movement of said supports for said tool to copy the contour of the pattern on said work piece.

30. In a copying machine, the combination of two supports respectively movable in different mutually angular paths for effecting relative movement of a tool and a work piece, transmission means for said support movement at various relative support rates, means associated with said transmission means for maintaining the instant sum of the rates of said supports at substantially a constant combined support rate value, two brake devices respectively for opposing the movement of the different supports by said transmission means and each adjustable for increasing or decreasing the braking effect thereof, power means for adjusting either of said brake devices to increase the braking effect thereof while simultaneously adjusting the other brake device to decrease its braking effect, and pattern controlled tracer means operatively controlling said power means to effect various relative rates of movement of said supports for said tool to copy the contour of the pattern on said work piece.

31. In a copying machine, the combination of two supports respectively movable in different mutually angular paths for effecting relative movement of a tool and a work piece, transmission mechanism for said support movement including two hydraulic motors respectively for the different supports and each having an outlet channel, a plurality of outlet throttle devices respectively associated with the outlet channel of the different motors and each adjustable for increasing or decreasing the throttling effect thereof, pressure liquid supply means adapted to supply a substantially constant volume of liquid to said two motors irrespective of the relative motor speeds, power means for adjusting either of said throttle devices to increase the throttling effect thereof while simultaneously adjusting the other throttle device to decrease its throttling effect, and pattern controlled tracer means operatively controlling said power means to effect various relative rates of movement of said supports for said tool to copy the contour of the pattern in said work piece.

32. In a copying machine the combination of two supports respectively movable in mutually angular line and in-out paths for effecting relative movement of a tool and a work piece, transmission means for said support movement including reversing means alternatively adjustable for in or out direction of movement in said in-out path, a brake device respectively for opposing the movement of said support in said line path adjustable for increasing or decreasing the braking effect thereof, power means for adjustment of said reversing means and of said brake device, pattern controlled tracer means operatively controlling said support movements for said tool to copy the contour of the pattern on said work piece including elements relatively movable under the control of said pattern between first and second relative positions respectively controlling said power for establishing an in and an out direction adjustment of said reverser means, said first and second positions each controlling said power means for increasing the braking effect of said line path brake device whereby to decelerate the rate of line path movement, and means for maintaining the instant sum of the rates of said supports at substantially a constant combined rate value during said deceleration, whereby the deceleration is accompanied by a substantially equal acceleration of the rate of the in-out path support.

33. In a copying machine, the combination of two supports respectively movable in different mutually angular line and in-out paths for effecting relative movement of a tool and a work piece, transmission mechanism for said support movement including two hydraulic motors respectively for the line and in-out path supports and each having an outlet channel, said transmission including reversing means for alternative in or out direction of actuation of said in-out path support motor, an outlet throttle device associated with the outlet channel of said line path support motor and adjustable for increasing or decreasing the throttling effect thereof, pressure liquid supply means adapted to supply a substantially constant volume of liquid to said two motors irrespective of the relative motor speeds, power means for said adjustment of said reversing means and of said throttle device, pattern controlled tracer means operatively controlling said power means including elements relatively movable under the control of said pattern between first and second relative positions respectively controlling said power means for establishing an in and an out direction adjustment of said reversing means, and first and second positions each controlling said power means for increasing the throttling effect of said line path motor outlet throttle device.

34. In a copying machine the combination of two supports respectively movable in different mutually angular paths for relative movement of a tool and a work piece, transmission means for said support movement at various relative support rates including means limiting the sum of the support rates substantially to a predetermined value whereby a deceleration of the rate of the support is accompanied by a substantially equal acceleration of the rate of the other support, two brake devices respectively opposing the movement of the different supports and each adjustable for increasing or decreasing the braking effect thereof, power means for the adjustment of said brake devices, and pattern controlled tracer means operatively controlling said power means for alternative increase of braking effect in the different brake devices whereby to effect alternate deceleration of the rate of the different supports for said tool to copy the form of the pattern on said work piece, said power means including a power connection automatically operative to supply to each brake device during braking adjustment thereof an instant braking energy substantially corresponding to the combined energy required for acceleration of the corresponding support and the accompanying deceleration of the other support during the same instant.

35. In a copying machine the combination of two supports respectively movable in different mutually angular paths for effecting relative movement of a tool and a work piece, transmission mechanism for said support movement including two hydraulic motors respectively for the different supports and each having an inlet and an outlet channel, a pressure liquid source simultaneously connected to the inlet channels of both said motors for the supply thereto of a substantially constant combined volume of liquid whereby a deceleration of the rate of the one motor is accompanied by a substantially equal acceleration of the rate of the other motor, a plurality of outlet throttle devices respectively associated with the outlet channels of the different motors and each adjustable for increasing or decreasing the throttling effect thereof, power means for the adjustment of said throttle devices, and pattern controlled tracer means operatively controlling said power means for alternate increase of the throttling effect in the different throttle devices whereby to effect alternate deceleration of the rate of the different supports for said tool to copy the form of the pattern on said work piece, said power means including a plurality of piston devices respectively for urging the different throttle devices in the direction increasing the throttling effect thereof and each connected to receive pressure liquid from the associated outlet channel at a point between the throttle device and the motor.

36. In a copying machine, the combination of two supports respectively movable in different mutually angular paths for effecting relative movements of a tool and a work piece, transmission means for said support movement at various relative support rates, means associated with said transmission means for maintaining the instant sum of the rates of said supports at substantially a constant combined support rate value, two adjustable brake devices respectively for opposing the movement of the different supports by said transmission means, power means for adjustment of said brake devices, pattern controlled tracer means operatively controlling said power means for said brake means to effect various relative rates of movement of said supports for said tool to copy the contour of the pattern on said work piece, supplemental adjustable brake means for opposing movement of said supports, and means controlling the braking effect of said supplemental brake means in accordance with variations in the power transmitted through said transmission means.

37. In a copying machine, the combination of two supports respectively movable in different mutually angular paths for effecting relative movements of a tool and work piece, transmission means for said support movement including means limiting the sum of the instant support rates to substantially a constant value, two brake devices respectively for opposing the movement of the different supports by said transmission means and each adjustable for increasing or decreasing the braking effect thereof, and control means for said transmission means including power means for adjusting said brake devices for effecting repeated cycles of alternate deceleration of the different supports in each cycle of which the deceleration of the one support is simultaneously accompanied by acceleration of the other support, said control means also including tracer means operatively controlling said power means to effect said cyclic deceleration under the control of a pattern surface angularly disposed relative to both said support paths, said control means effecting during each cycle of said alternate deceleration an average rate of movement of each support substantially corresponding to the relative support rate required for said tool to copy said pattern angle on the work piece with the supports moving at constant rate.

38. In a copying machine, the combination of two supports respectively movable in different mutually angular paths for effecting relative movements of a tool and a work piece, transmission mechanism for said support movement including two hydraulic motors respectively for the different supports and each having an outlet channel and an inlet channel, a pressure liquid supply source connected for the simultaneous supply of liquid to said motor inlet chanels and adapted to supply a substantially constant volume of liquid thereto, a plurality of outlet throttle devices respectively associated with the outlet channel of the different motors and each adjustable for increasing or decreasing the throttling effect thereto, and control means for said transmission mechanism including power means for adjusting said throttle valves for effecting repeated cycles of alternate deceleration of the different supports in each cycle of which the deceleration of the one support is simultaneously accompanied by acceleration of the other support, said control means also including tracer means operatively controlling said power means under the control of a pattern surface angularly disposed relative to both said paths, said control means effecting during each cycle of said alternate deceleration an average rate of movement of each support substantially corresponding to the relative support rate required for said tool to copy said pattern angle on the work piece with the supports moving at constant speed.

39. In a copying machine, the combination of two supports respectively movable in different mutually angular paths for effecting relative movements of a tool and a work piece, transmission mechanism for said support movement including two hydraulic motors respectively for the different supports and each having an outlet channel and an inlet channel, a pressure liquid supply source connected for the simultaneous supply of liquid to said motor inlet channels and adapted to supply a substantially constant combined volume of liquid thereto, a plurality of outlet throttle devices respectively associated with the outlet channel of the different motors and each adjustable for increasing or decreasing the throttling effect thereof, control means for said transmission mechanism including power means for adjusting said throttle valves for effecting repeated cycles of alternate deceleration of the different supports in each cycle of which the deceleration of the one support is simultaneously accompanied by acceleration of the other support, said control means also including tracer means operatively controlling said power means under the control of a pattern surface angularly disposed relative to both said paths and effecting during each cycle of said alternate deceleration an average rate of movement of each support substantially corresponding to the relative support rates required for said tool to copy said pattern angle on the work piece with the supports moving at constant speed, and supplemental control means including means operative during each cycle of said alternate deceleration to limit the maximum rate to which one of said supports is accelerated in a manner such that repeated increments of the limitation during a series of said cycles limits the last mentioned support to a substantially constant rate substantially corresponding to said constant rate required for the tool to copy the pattern angle.

FRED A. PARSONS.